(12) United States Patent
Aggarwal et al.

(10) Patent No.: US 6,922,700 B1
(45) Date of Patent: Jul. 26, 2005

(54) SYSTEM AND METHOD FOR SIMILARITY INDEXING AND SEARCHING IN HIGH DIMENSIONAL SPACE

(75) Inventors: Charu Chandra Aggarwal, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,471

(22) Filed: May 16, 2000

(51) Int. Cl.$^7$ ................................................. G06F 7/00
(52) U.S. Cl. ..................... 707/104.1; 707/2; 707/102
(58) Field of Search ................... 707/1–10, 100–104.1, 707/200, 201, 205, 506, 530, 531; 702/127, 179–181; 711/100, 170, 173; 715/500, 530, 531, 764, 853, 854; 345/418, 419, 764, 853, 854

(56) References Cited

U.S. PATENT DOCUMENTS

| | | | | |
|---|---|---|---|---|
| 4,615,496 A | * | 10/1986 | Pinson | 244/3.16 |
| 5,396,418 A | * | 3/1995 | Heuscher | 378/15 |
| 5,675,819 A | * | 10/1997 | Schuetze | 704/10 |
| 5,689,585 A | * | 11/1997 | Bloomberg et al. | 382/229 |
| 5,754,939 A | * | 5/1998 | Herz et al. | 455/3.04 |
| 5,870,752 A | * | 2/1999 | Gibbons et al. | 707/101 |
| 5,905,769 A | * | 5/1999 | Lee et al. | 327/156 |
| 5,963,739 A | * | 10/1999 | Homeier | 717/126 |
| 5,966,131 A | * | 10/1999 | Marks | 345/418 |
| 5,990,871 A | * | 11/1999 | Adams et al. | 345/157 |
| 6,081,269 A | * | 6/2000 | Quarendon | 345/419 |
| 6,085,095 A | * | 7/2000 | Collmann | 455/446 |
| 6,161,105 A | * | 12/2000 | Keighan et al. | 707/100 |
| 6,236,982 B1 | * | 5/2001 | Mahajan et al. | 706/45 |
| 6,337,692 B1 | * | 1/2002 | Rai et al. | 345/589 |
| 6,424,967 B1 | * | 7/2002 | Johnson et al. | 707/101 |

* cited by examiner

Primary Examiner—Greta Robinson
Assistant Examiner—Harold E. Dodds, Jr.
(74) Attorney, Agent, or Firm—Frank V. DeRosa; F. Chau & Associates, LLC

(57) ABSTRACT

A system and method for providing similarity indexing and searching in multi-dimensional databases. In one aspect, given a set of data points in a multidimensional space, the values of the data points on each dimension are partitioned into a plurality of grids, wherein each grid is assigned a grid value. Given a target data point, similarity candidates (i.e., data points that are similar to the target data point) are identified based on matching grid values. An inverted grid index comprising an index on the data points falling into each grid of each dimension is utilized to identify similarity candidates. A similarity selection process is employed to select the closest identified similarity candidates for output, which utilizes a similarity function to measure the closeness of each identified similarity candidate to the target data point. A preferred similarity function is one that considers a subset of the dimensions in which a point falls within a similar grid of the target point. In addition, a correlation effect among the grids in different dimensions may be a factor captured in the similarity function.

50 Claims, 14 Drawing Sheets

| (dimension, grid) | Range | Inverted Grid list |
|---|---|---|
| (1, 1) | (0, 10) | (1, 2.5) (5, 3.5) |
| (1, 2) | (10, 15) | (3, 11) (7, 14.5) |
| (1, 3) | (15, 30) | (2, 16) (4, 28) |
| (1, 4) | (30, 100) | (6, 31) (8, 95) |
| (2, 1) | (0, 20) | (6, 1) (8, 18) |
| (2, 2) | (20, 25) | (1, 21) (5, 24) |
| (2, 3) | (25, 40) | (2, 26) (3, 38) |
| (2, 4) | (40, 50) | (4, 41) (7, 48) |
| (3, 1) | (0, 5) | (1, 2.5) (5, 4) |
| (3, 2) | (5, 15) | (3, 6) (8, 14) |
| (3, 3) | (15, 30) | (7, 16) (2, 28) |
| (3, 4) | (30, 60) | (6, 31) (4, 59) |

FIG. 3 Inverted Grid Index

| Point id | Value | Grid Coordinate |
|---|---|---|
| 1 | (2.5, 21, 2.5) | (1, 1) (2,2) (3,1) |
| 2 | (16, 26, 28) | (1, 3) (2, 3) (3, 3) |
| 3 | (11, 38, 6) | (1, 2) (2, 3) (3, 2) |
| 4 | (28, 41, 59) | (1, 3) (2, 4) (3, 4) |
| 5 | (3.5, 24, 4) | (1, 1) (2, 2) (3, 1) |
| 6 | (31, 1, 31) | (1, 4) (2, 1) (3, 4) |
| 7 | (14.5, 48, 16) | (1, 2) (2, 4) (3, 3) |
| 8 | (95, 18, 14) | (1, 4) (2, 1) (3, 2) |

FIG. 4

Figure 5:
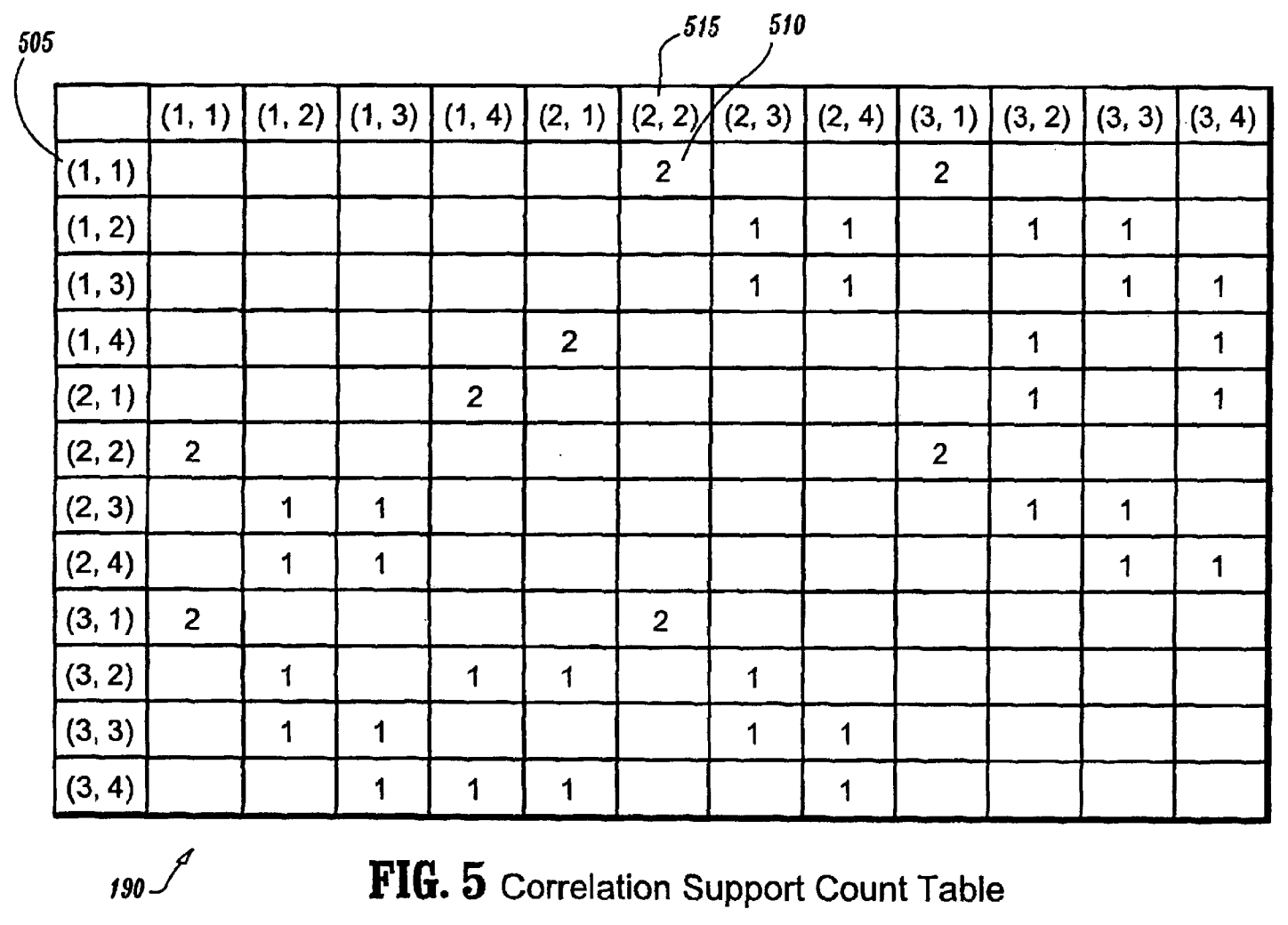

FIG. 5 Correlation Support Count Table

|       | (1,1) | (1,2) | (1,3) | (1,4) | (2,1) | (2,2) | (2,3) | (2,4) | (3,1) | (3,2) | (3,3) | (3,4) |
|-------|-------|-------|-------|-------|-------|-------|-------|-------|-------|-------|-------|-------|
| (1,1) |       |       |       |       |       |       |       |       |       |       |       |       |
| (1,2) |       |       |       |       |       |       | 1     |       |       |       |       |       |
| (1,3) |       | 1     |       |       |       |       | 1     |       |       |       | 1     |       |
| (1,4) | 2     | 1     |       |       |       |       |       | 1     |       |       |       |       |
| (2,1) |       |       |       | 2     |       |       |       |       |       |       |       |       |
| (2,2) | 2     |       |       |       |       |       |       |       | 2     |       |       |       |
| (2,3) |       | 1     | 1     |       |       |       |       |       |       | 1     | 1     | 1     |
| (2,4) |       |       |       |       |       |       |       |       |       | 1     |       | 1     |
| (3,1) |       |       |       |       |       | 2     |       |       |       |       |       |       |
| (3,2) |       |       | 1     |       | 1     |       | 1     | 1     |       |       |       | 1     |
| (3,3) |       |       | 1     | 1     | 1     |       |       |       |       |       |       |       |
| (3,4) |       |       | 1     | 1     |       |       |       | 1     |       |       |       |       |

| (dimension, grid) | Correlation list |
|---|---|
| (1, 1) | (2, 2) (3, 1) |
| (1, 2) | |
| (1, 3) | |
| (1, 4) | (2, 1) |
| (2, 1) | (1, 4) |
| (2, 2) | (1, 1) (3, 1) |
| (2, 3) | |
| (2, 4) | |
| (3, 1) | (1, 1) (2, 2) |
| (3, 2) | |
| (3, 3) | |
| (3, 4) | |

FIG. 6 Correlation Table

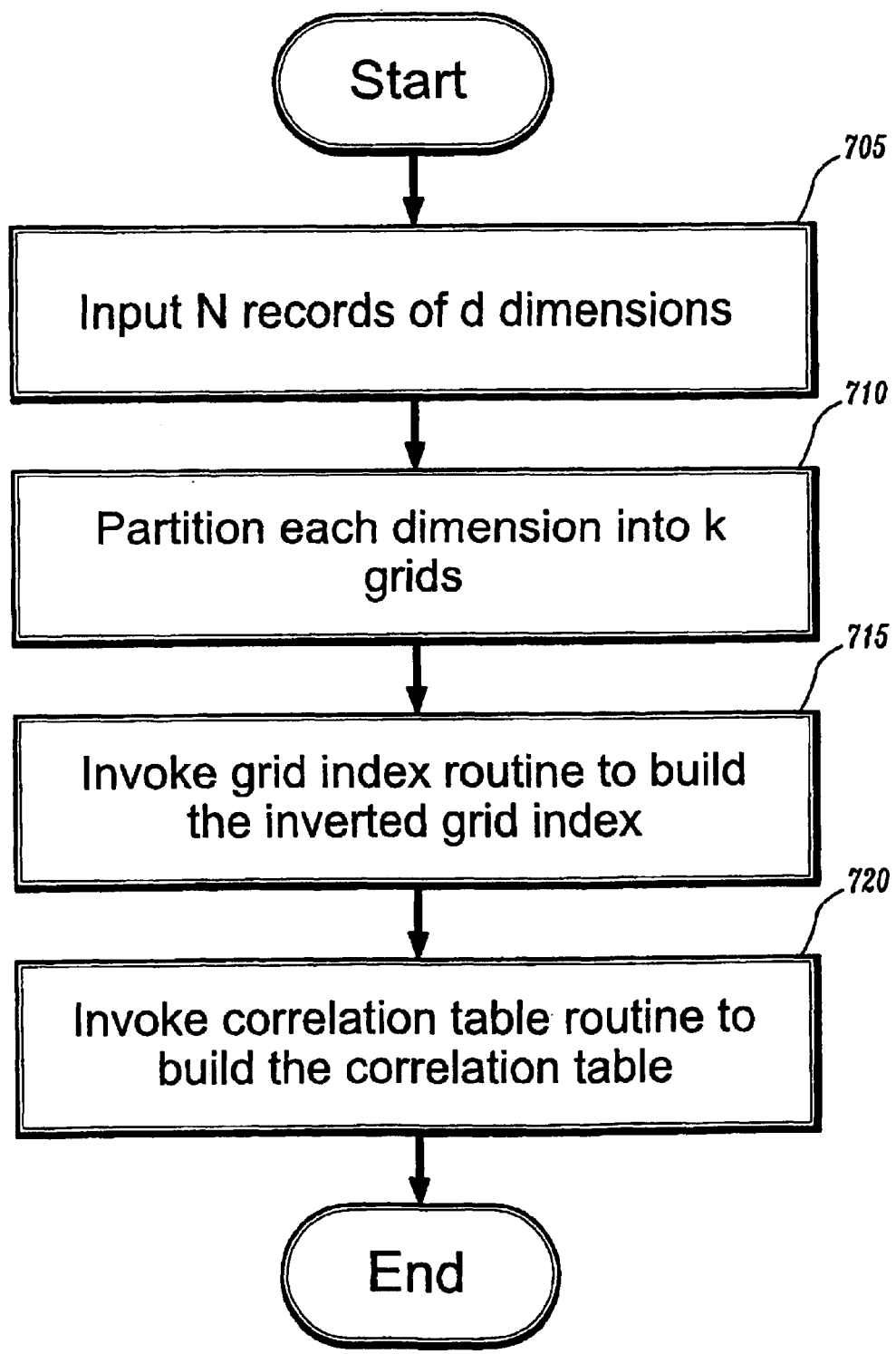
FIG. 7 Build Routine

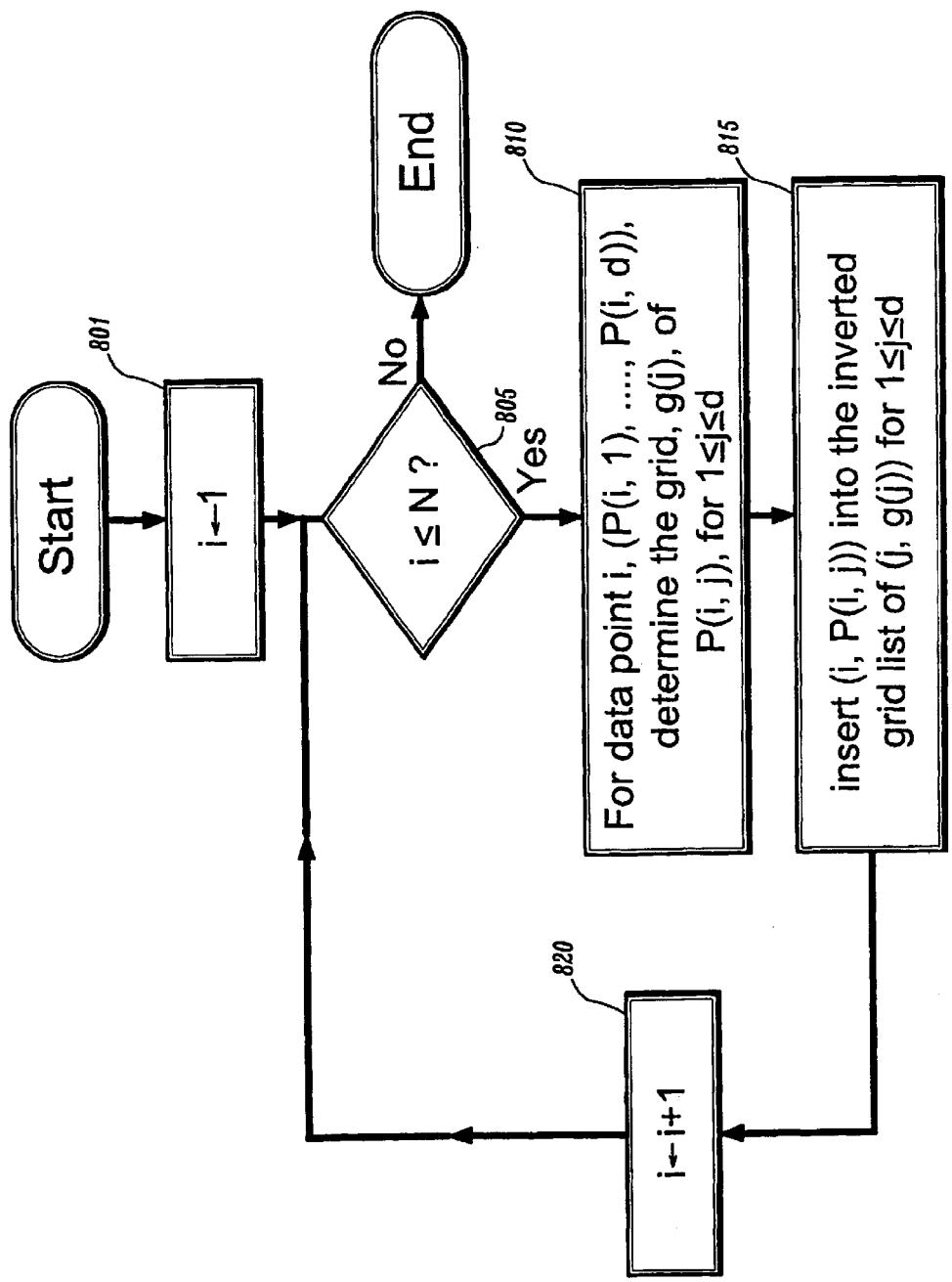
FIG. 8 Grid Index Routine

| id | Score |
|---|---|
| | |
| | |
| | |
| | |
| | |
| | |
| | |
| | |
| | |
| | |
| | |

FIG. 10a Score Table

FIG. 10b Similarity Search Routine

FIG. 12 Correlation Capture Routine

SYSTEM AND METHOD FOR SIMILARITY INDEXING AND SEARCHING IN HIGH DIMENSIONAL SPACE

BACKGROUND

1. Technical Field

The present invention relates generally to managing data in a multi-dimensional space and, more specifically, to a system and method for indexing data by partitioning the data in each dimension into a plurality of grids and searching the indexed data to find similarity candidates of target data based on matching grid values.

2. Description of Related Art

With the increasing availability of large repositories of high dimensional data in numerous application domains, techniques for indexing such data and providing efficient, real-time, query processing and searching of such data are becoming increasingly important. There are various techniques that are utilized or have been proposed for indexing and searching multi-dimensional data. One such technique is similarity indexing and searching which, in general, involves finding the closest record to a given target record in a multi-dimensional space based on some predefined similarity measure. This technique may be employed in numerous domains such as spatial databases, multimedia systems, data mining, and image retrieval.

By way of example, in the World Wide Web (WWW) environment, similarity document searches may be implemented wherein each document is represented as a vector of distinct words with an associated frequency count for each word. Moreover, in an E-commerce environment, a collaborative filtering technique may be employed to identify peer groups in order to make more effective product recommendations. A general idea of collaborative filtering is to have each user provide ratings on a set of products and services, and then identify other users with similar taste to form peer groups so that the collective group knowledge can be shared within a peer group. With this method, each user can be represented by a vector of products with an associated rating for each product. The above examples illustrate the need for implementing high dimensional indexing and searching, since the number of distinct words or products can be in the tens of thousands. Thus, similarity indexing and searching techniques, which can handle high dimensional data space, are important for applications requiring real-time processing.

Traditional indexing techniques generally work well for very low dimensional problems, but degrade rapidly with increasing dimensionality, so that each query requires the access of almost all of the data. Accordingly, an efficient and accurate similarity indexing and searching technique which can handle high dimensional data without having to fully specify each data point in every dimension, and which provides real-time searching capability, is highly desirable.

SUMMARY OF THE INVENTION

The present invention is directed to a system and method for managing data in a multi-dimensional space. In one aspect of the present invention, given a set of data points in a multidimensional space, the values of the data points on each dimension are partitioned into a plurality of grids, wherein each grid is assigned a grid value. Given a target data point, similarity candidates (i.e., data points that are similar to the target data point) are identified based on matching grid values.

In another aspect of the present invention, an inverted grid index comprising an index on the data points falling into each grid of each dimension is utilized to identify similarity candidates. More specifically, a preferred inverted grid index comprises attribute fields for storing grid coordinates (i.e., dimension/grid pairs), boundary values of a corresponding grid, and an inverted grid list comprising all data points that fall within the corresponding grid coordinate. For a given target data point, the grid coordinates for each dimension of the target point can be determined, and then similarity candidates can be identified by the inverted grids lists corresponding to the grid coordinates of the target data point.

In yet another aspect of the present invention, a similarity score is computed for each of the identified similarity candidates, and those similarity candidates having a similarity score that meet a predefined selection criterion are returned as the results of the search. More specifically, a similarity function is employed to evaluate each of the identified similarity candidates and the result of the evaluation is a score representing the closeness (or similarity) of the similarity candidate to the target data point. Preferably, for a given similarity candidate, the similarity function considers a subset of the dimensions (e.g., the dimensions wherein the target data point and similarity candidate having a similar grid values) to compute the similarity score and the score is additive over each dimension in the subset of dimensions. Those similarity candidates having a score that meets a predetermined threshold value are selected for output. Alternatively, the similarity candidates having the u-best scores can be selected for output.

In another aspect of the present invention, correlation data representing a correlation between the grids in different dimensions is generated and stored in a correlation table. The correlation data is utilized by the similarity function so that inter-grid correlation effect among the grids in different dimensions is captured in the similarity evaluation.

These and other aspects, features, and advantages of the present invention will be described or become apparent from the following detailed description of the preferred embodiments, which is to be read in connection with the accompanying drawings.

BRIEF DESCRIPTION OF THE DRAWINGS

FIG. 3 is a diagram of a data structure of an inverted grid index according to an embodiment of the present invention;

FIG. 4 is a diagram of exemplary data records of an input data collection;

FIG. 5 is a diagram of a data structure of a correlation support count table according to an embodiment of the present invention;

FIG. 6 is a diagram of a data structure of a correlation table according to an embodiment of the present invention;

FIG. 7 is a general flow diagram of a method for generating an inverted grid index and correlation table for a given set of input records according to one aspect of the present invention;

FIG. 8 is a flow diagram of a method for generating an inverted grid index according to one aspect of the present invention;

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

I. General Overview

Figure 1:
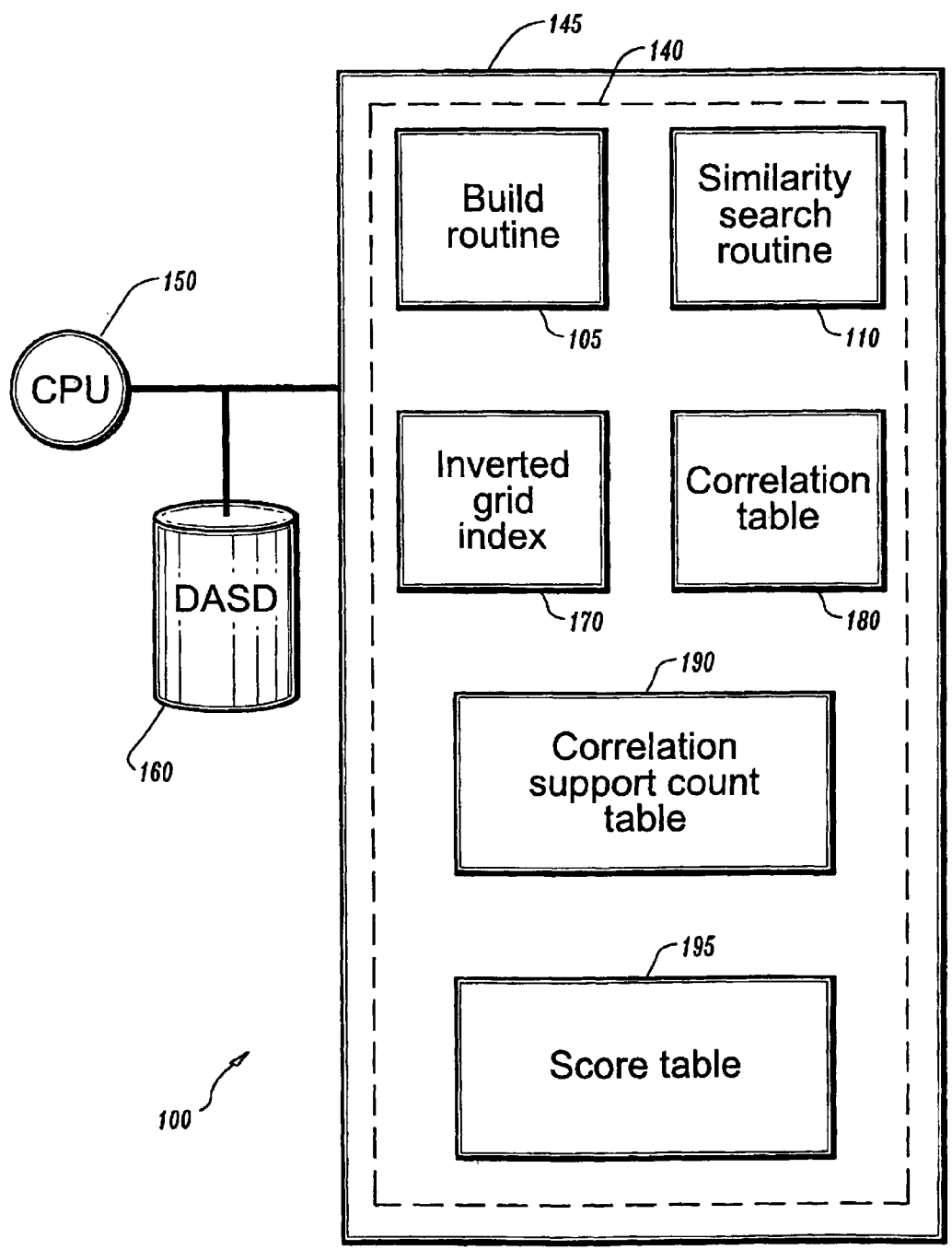
FIG. 1 is a block diagram of a system for providing similarity indexing and searching according to an embodiment of the present invention.

Referring now to FIG. 1, a block diagram illustrates a system for providing similarity indexing and searching according to an embodiment of the present invention. In particular, the system 100 depicted in FIG. 1 is an example of an architecture of a computing node such as a WWW content server, a proxy server, a database server, etc. In general, the system 100 comprises CPU 150, a memory 145 (e.g., RAM), and a storage device 160 (e.g., a DASD (direct access storage device)). The memory 145 stores the server logic 140 which, as indicated above, is preferably embodied as computer executable code that is loaded from the DASD 160 into memory 145 for execution by CPU 150.

The server logic 140 comprises a build routine 105 for building an inverted grid index 170, a correlation table 180, and a correlation support count table 190, all of which are maintained by the server logic 140. A score table 195 is also maintained by the server logic 140. The data associated with the inverted grid index 170, correlation table 180, correlation support count table 190, and score table 195 can reside either in the storage device 160 or the main memory 145.

The system 100 further comprises a similarity search routine 110 that utilizes the information comprising the inverted grid index 170, correlation table 180, and score table 195 for retrieving data records that are similar to a given target record. For example, in an E-commerce application where a customer profile record exists for each customer, a similarity search routine in accordance with the present invention is employed to identify other customers having a profile that is similar to a given target customer. Each of these system components and routines will be explained in detail below with reference to their respective Figures.

Figure 2:
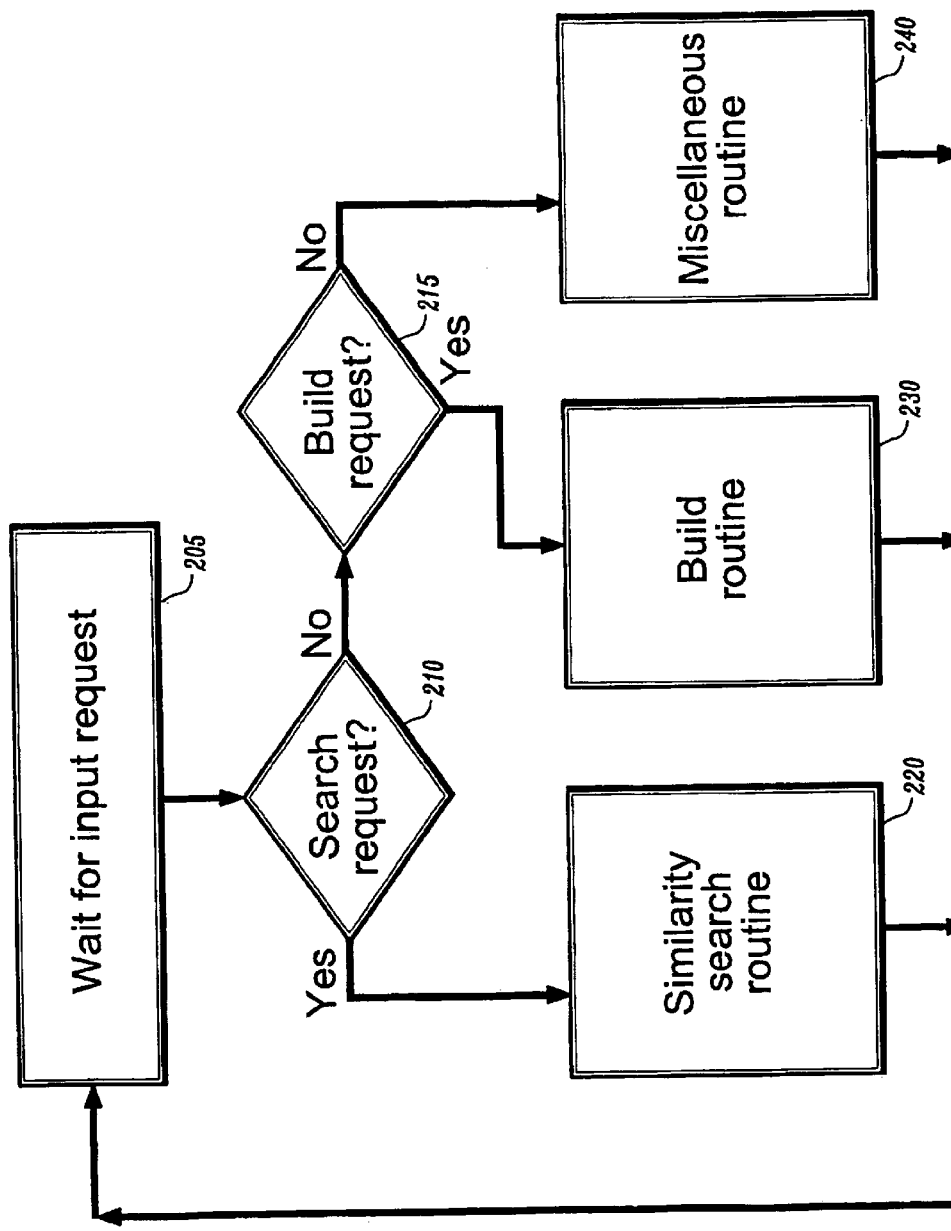
FIG. 2 is a flow diagram of a method of operation of the system of FIG. 1 for providing similarity indexing and searching according to one aspect of the present invention.

The flow diagram of FIG. 2 depicts an example of the flow of the server logic 140 according to one aspect of the present invention. During operation of the system 100 in FIG. 1, the server routine 140 will wait for an input request (step 205). When an input query is received, the server logic will determine the nature of the query. If the query is determined to be a search request (affirmative result in step 210), a similarity search routine according to the present invention will be invoked (step 220). If the query is determined to be a build request (affirmative result in step 215), a build routine according to the present invention will invoked (step 230) for building an inverted grid index and correlation table for a given set of input records. Other miscellaneous query types may also be received that invoke corresponding routines (step 240). Such miscellaneous routines include routines to dynamically add, delete, or update a data record from the database, as well as update the inverted grid index and correlation table accordingly.

II. Similarity Indexing

The following section describes exemplary data structures and methods for indexing data in a multi-dimensional space according to an embodiment of the present invention. Referring now to FIG. 3, a diagram illustrates a data structure for an inverted grid index according to an embodiment of the present invention. In the exemplary embodiment of FIG. 3, there are 8 data records and each record comprises three dimensions. The coordinates of the 8 data records are shown in FIG. 4 (as explained below). As illustrated, an inverted grid index 170 comprises three attribute fields. A first attribute field 305 comprises a dimension/grid pair (305) (or what is referred to herein as a "grid coordinate"). For example, grid coordinate (1, 2) 320 represents grid 2 of dimension 1. In the exemplary embodiment described herein, there are d dimensions, where d=3, and each of these dimensions are partitioned into k ranges (or grids), where k=4. Accordingly, as illustrated in FIG. 3, there are 12 dimension/grid pairs (grid coordinates) comprising the exemplary inverted grid index 170.

A second attribute field 310 comprises the range of the corresponding grid in the form of a tuple (e.g., lower bound, upper bound). For example, for grid coordinate (1, 2) 320, an upper bound of the grid values is 15 and the lower bound is 10, as given by the tuple (10, 15) 330. In general, for a grid coordinate (h, q), the notation m(h, q) denotes the upper bound of its range and n(h, q) denotes a lower bound of its range (e.g., for grid coordinate (1, 2) 320, m(1, 2) is 15 and n(1, 2) is 10).

A third attribute field 315 of the exemplary inverted grid index 170 comprises an inverted grid list comprising all data points that fall within the corresponding grid. More specifically, each entry in the inverted grid list 315 for a given data point comprises a point id for the data point, as well as the actual value of corresponding coordinate. For example, for the grid coordinate (1,2) 320, the entry (3, 11) in the corresponding inverted grid list 340 denotes data point 3 with a coordinate value (in the first dimension) of 11. Likewise, the entry (7, 14.5) in the inverted grid list 340 denotes a data point 7 with a coordinate value (in the first dimension) of 14.5. It is to be noted that both coordinate values 11 and 14.5 fall within the corresponding grid range of (10, 15). In general, for the $i^{th}$ entry in an inverted grid list, the notation id(i) denotes a point id of the data point and the notation val(i) denotes its coordinate value on the corresponding dimension of the grid coordinate (e.g., for the grid coordinate (1, 2), the first entry in the inverted grid list is (3, 11) and hence id(1) and val(1) are 3 and 11, respectively, and id(2) and val(2) are 7 and 14.5, respectively, for the second entry of the grid coordinate (1, 2)).

It is to be understood that the inverted grid index 170 of FIG. 3 is constructed based on the exemplary data records set forth in the table of FIG. 4. More specifically, FIG. 4 provides an example of a collection of 8 data points in a 3-dimensional space. The table comprises three attributes fields. A first attribute field 405 comprises a point id assigned to each data point. A second attribute field 410 provides the attributes (or actual coordinate value) of each dimension for the record. In particular, for purposes of illustration, each data point comprises three attributes, one for each of the d=3 dimensions (although it is to be understood that, based on the given application, one or more data points in a given collection may not comprise a coordinate for one or more dimensions). A third attribute field 415 provides the grid coordinates based on the range partitions indicated in the second attribute field 310.

By way of example, the coordinates 425 for the data point with point id 1 420 are 2.5, 21, 2.5 for the first, second and third dimensions, respectively. In particular, the first coordinate 2.5 falls within grid coordinate (1, 1), the second coordinate 21 falls in grid coordinate (2, 2), and the third coordinate 2.5 falls in grid coordinate (3, 1). Therefore, the grid coordinates for data point 1 in the grid coordinate attribute field 440 are (1, 1)(2, 2)(3, 1) 440 as illustrated.

It is to be appreciated by those skilled in the art that there are a variety of manners for selecting the parameter k (i.e., the number of grids per dimension). The choice of parameter k can affect both the search time and the quality of the result. In general, for d-dimensional data, k can be chosen to be d or be proportional to d, or be on the same order of magnitude as d. It is to be appreciated that by selecting the number of grids k based on the number of dimensions d, the number of data points accessed during a similarity search can be made independent of the number of dimensions. More specifically, since the number of points accessed during the search is dN/k, where N is the total number of indexed points, the number of points accessed during the search will be independent of the number of dimensions d if d is proportional to k.

It is to be further appreciated by those skilled in the art that there are many different variations for partitioning the data values to create the grids on each dimension. One method includes equal range partitioning. In addition, an equi-depth range partitioning may be employed, wherein each partition comprises substantially the same number of data points. By way of example, in the exemplary embodiment herein, each grid comprises 2 data points under the equi-depth partitioning (as illustrated by the inverted grid lists (315) of FIG. 3, as each dimension is partitioned into 4 grids. The equi-depth partitioning approach has the advantage of equalizing the number of points in each grid to make the search performance through the index more predictable.

In the presence of highly skewed data, however, equi-depth partitioning may not be feasible. For example, an equi-depth partitioning of one thousand points into 100 grids means that each grid will take 10 points. If 50 points have the same value, however, the equi-depth partitioning may not be feasible. In this case, however, each single high skew value can be assigned to one grid and the remaining data values partitioned among the remaining number of grids in an equi-depth fashion. In certain instances, a really high skewed value may be ignored, i.e. no inverted grid list will be maintained for that value. The partitioning method is application dependent (as discussed below).

Furthermore, as indicated above, it is to be understood that the inverted grid index 170 does not require each data point to be fully specified in each dimension (notwithstanding that each of the exemplary data points of FIG. 4 have coordinates in each dimension). This especially relevant in really high dimension applications with thousands of dimensions (such as described below with respect to collaborative filtering), where it is not uncommon that data points are not fully specified in all dimensions.

It is to be appreciated that in a high dimensional space, many of the dimensions are correlated with one another. Advantageously, these correlations may be used to magnify the effect of high dimensional skews while measuring similarity. Furthermore, the use of inter-dimension summary information provides potential insight into the similarity of two data points by examining whether commonly co-occurring inter-dimension values are present in the two data points. Indeed, the use of aggregate behavior of the data to measure similarity becomes increasingly valuable for high dimensional data, where there may be considerable redundancies, dependencies, and relationships among the large number of attributes.

Advantageously, the present invention tracks inter-dimension information for purposes of similarity indexing and searching. More specifically, as indicated above, a correlation support count table 190 (an example of which is depicted in FIG. 5) may be generated for capturing co-occurring inter-dimension values (i.e. the grid dimensions) within a data point. The correlation support count table 190 can be utilized to generate a correlation table 180 (an example of which is depicted in FIG. 6) which identifies correlated grid dimensions.

More specifically, referring now to FIG. 5, a diagram illustrates an exemplary correlation support count table according to one aspect of the present invention. For illustrative purposes, each entry in the correlation support count table 190 is denoted as ((p, q)(r, s)), where the row coordinate of a given entry is denoted (p, q) and the column coordinate of the entry is denoted (r, s). For example, the ((1,1)(2,2)) entry 510 represents the entry at the intersection of row (1,1) 505 and column (2,2) 515. A ((p, q)(r, s)) entry indicates the number of points in the data collection having a p-dimension coordinate in grid q and an r-dimension coordinate in grid s (i.e. the number of points that include both the (p, q) and (r, s) grid coordinates). For example, the ((1,1)(2,2)) entry 510 has a support count of "2" since, based on the grid coordinates depicted in FIG. 4, only two data points 1 and 5 commonly have the (1, 1) and (2, 2) grid coordinates.

Figure 6:
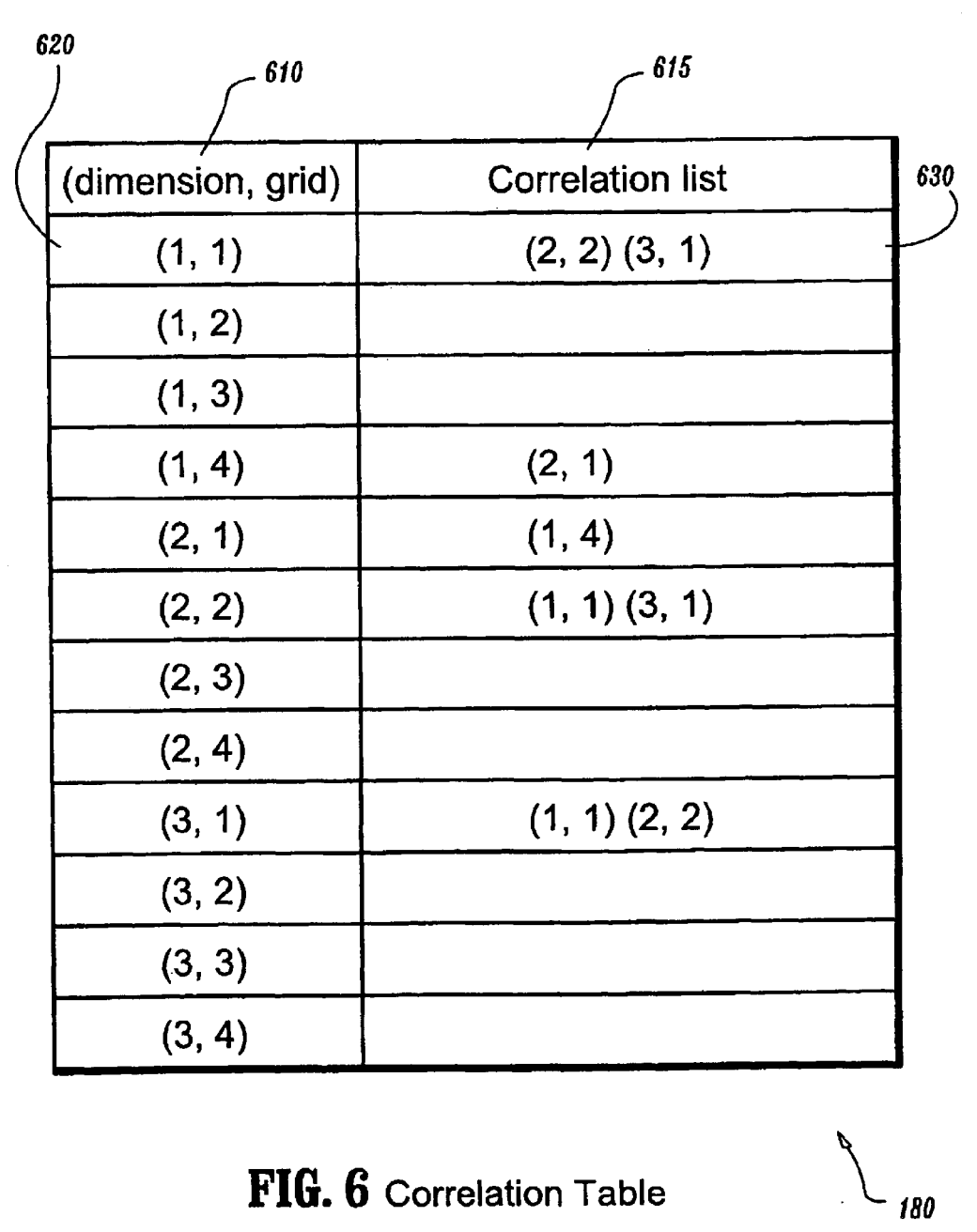

Referring now to FIG. 6, an exemplary correlation table 180 is shown, which is generated from the data comprising the exemplary correlation support count table 190 of FIG. 5. A correlation table 180 according to one aspect of the present invention comprises two attribute fields. A first attribute field 610 comprises the grid coordinate (i.e., the dimension/grid pair), and a second attribute field 615 comprises a corresponding correlation list. Each entry in the correlation list field 615 denotes every other grid coordinate that is "strongly correlated" to the grid coordinate entry in the first attribute field 610. More specifically, according to one aspect of the present invention, for each entry ((p, q)(r, s)) in the correlation support table 190 that meets a predetermined correlation threshold (w), the corresponding grid coordinates (p, q) and (r, s) are considered to be "strongly correlated." For example, assuming the correlation threshold w is "2", referring to FIG. 5, grid coordinate (1,1) 505 is strongly correlated to grid coordinates (2,2) and (3,1) (since the entry for the support count is at least 2). Therefore, in the exemplary correlation table 180 of FIG. 6, the correlation list 630 comprises (2,2) and (3,1) for the grid coordinate (1,1) 620. The remaining correlation list entries depicted in FIG. 6 can readily be determined from the support count entries depicted in FIG. 5 (assuming of course a correlation threshold w=2).

Referring now to FIG. 7, a flow diagram illustrates a method for building an inverted grid index and correlation table for a given set of input records according to one aspect of the present invention. Initially, when a build routine is invoked (step 230 of FIG. 2), the system user will input a total of N d-dimension records to build the data structures (step 705). Each dimension is then partitioned into k grids (step 710) based on the intended application using any suitable partitioning method (such as described herein). Next, a grid index routine is invoked to build an inverted grid index for the multi-dimensional (partitioned) data (step 715). A method for building an inverted grid index according to one aspect of the present invention is described below with reference to FIG. 8. After the inverted grid index is built, a correlation table routine is invoked to build a correlation table (step 720). A method for building a correlation support count table and correlation table according to one aspect of the present invention is described below with reference to FIG. 9.

Referring now to FIG. 8, a flow diagram illustrates a method for building an inverted grid index according to one aspect of the present invention. Initially, a counter i is set to 1 (step 801). A determination is made as to whether the value of counter i is $\leq N$ (step 805), where N is the total number of data points in the collection. If the value of counter i is $\leq N$ (affirmative result in step 805), for data point i with a coordinate (value) of (P(i,1), P(i,2), ..., P(i,d)), the grid coordinate is determined for each dimension d (step 810). More specifically, for the $j^{th}$ dimension, the grid g(j) selected for P(i, j) is the $j^{th}$ dimension range (based on the partitioning) that can contain P(i, j). Next, each entry (i, P(i, j)) is inserted into the inverted grid list (e.g., field 315 of FIG. 3) for the corresponding grid coordinate (j, g(j)) (e.g., field 305 of FIG. 3) for $1 \leq j \leq d$ (step 815). The counter i is then incremented by 1 (step 820) and the process flow returns to step 805. The above process is repeated for all data points in the collection.

The flow diagram of FIG. 8 depicts an exemplary method for building an inverted grid index by inserting one point at a time from a batch of N points into the inverted grid index. Therefore, it is to be appreciated that steps 810 and 820 described above may also be utilized for dynamically adding, deleting and/or updating data values of the grid index. More specifically, steps 810 and 820 may be used directly to perform random point insertion into the index. For random deletion of a point from the index, step 810 may be used to identify the grid coordinate of the point, and step 815 may be modified to delete (instead of insert) (i, P(i, j)) from the inverted grid list of the grid coordinate (j, g(j)), for $1 \leq j \leq d$. Furthermore, to update a point from the coordinate (P(i, 1), P(i, 2), ..., P(i, d)) to (Q(i, 1), Q(i, 2), ..., Q(i, d)), the point (P(i, 1), P(i, 2), ..., P(i, d)) can first be deleted and then the point (Q(i, 1), Q(i, 2), ..., Q(i, d)) can be inserted.

Figure 9:
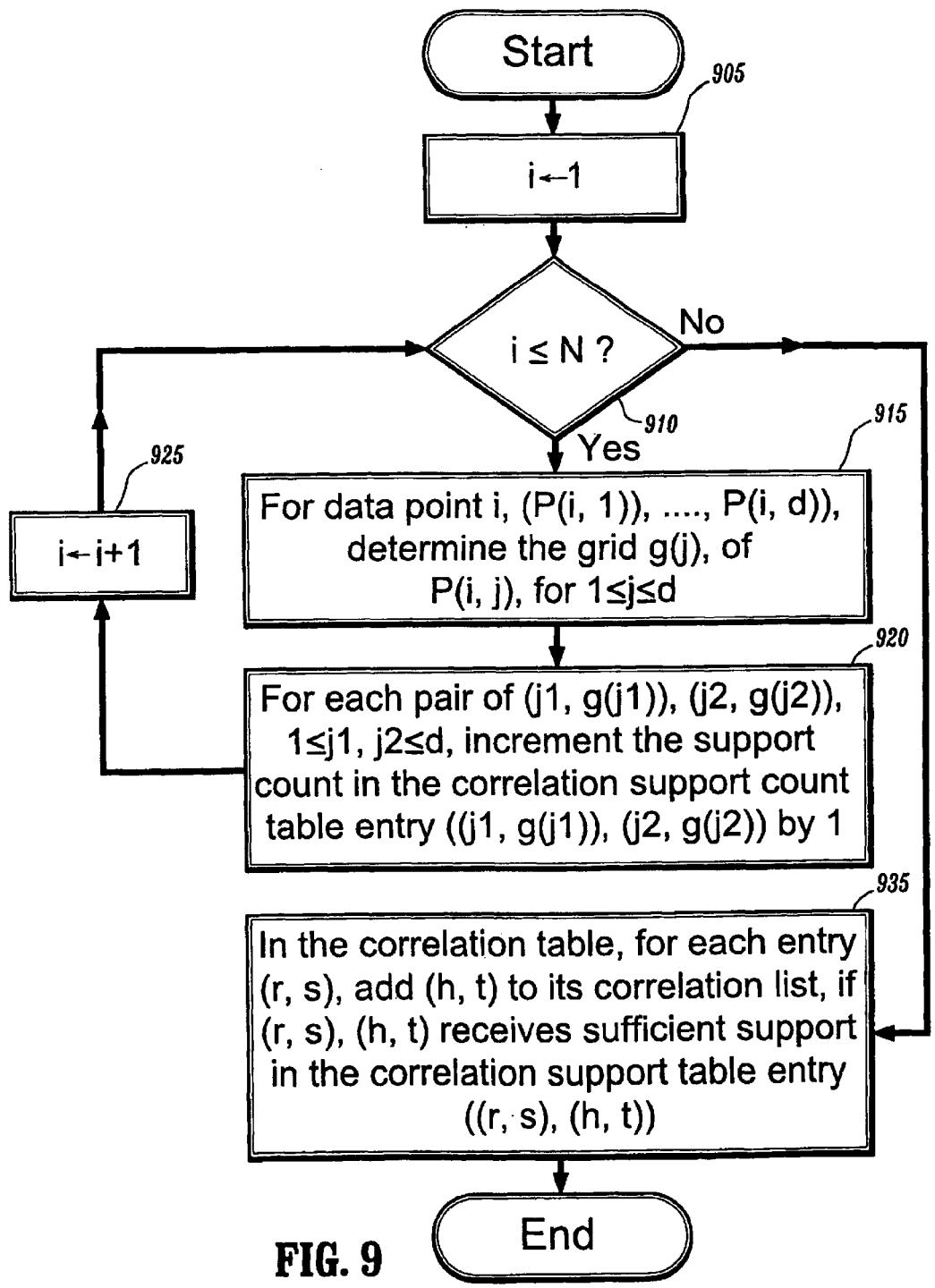
FIG. 9 is a flow diagram of a method for generating a correlation table according to one aspect of the present invention.

Referring now to FIG. 9, a flow diagram illustrates a method for generating a correlation table according to one aspect of the present invention. Initially, a counter i is set to 1 (step 905). A determination is made as to whether the value of counter i is $\leq N$ (step 910), where N is the total number of data points in the collection. If the value of counter i is $\leq N$ (affirmative result in step 910), for data point i with a coordinate of (P(i, 1), P(i, 2), ..., P(i, d)), the grid coordinate (j, g(j)) is determined for each dimension j for $1 \leq j \leq d$. Specifically, for the $j^{th}$ dimension, the grid g(j) selected for P(i,j) is the $j^{th}$ dimension range that can contain P(i,j). Then, for each pair of (j1, g(j1)), (j2, g(j2)), $1 \leq j1$, $j2 \leq d$, the support count of the entry ((j1, g(j1)), (j2, g(j2)) in the correlation support count table 190 is incremented by 1 (step 920). The counter i is then incremented by 1 (step 925). The above process is repeated for all data points.

If the value of counter i is not $\leq N$ (negative result in step 910), for each grid coordinate entry (r, s) in the correlation table (180), an additional item (h, t) is added to its correlation list, if ((r, s), (h, t)) receives sufficient support in the correlation support table, i.e. exceeding the correlation threshold w.

The flow diagram of FIG. 9 depicts an exemplary method for building a correlation table for a batch of N data points. During random point insertion process as described above, the correlation table should be updated along with the inverted grid index. It is to be appreciated that steps 915 and 920 described above may be used to modify the correlation support count table based on a random point insertion in the inverted grid index. Moreover, for a random deletion of a point from the inverted grid index, step 915 may be used to identify the point grid coordinate, and step 920 can be modified to decrement (instead of increment) the support count of the entry ((j1, g(j1)),(j2, g(j2)) in the table, for each pair of ((j1, g(j1)), (j2, g(j2)), $1 \leq j1$, $j2 \leq d$.

To update a point from the coordinate P(i, 1), P(i, 2), ..., P(i, d)) to (Q(i, 1), Q(i, 2), ..., Q(i, d)), the point P(i, 1), P(i, 2), ..., P(i, d)) can first be deleted from the correlation support count table and then the point (Q(i, 1), Q(i, 2), ..., Q(i, d)) can be inserted into the correlation support count table. Then, in the correlation support count table, for each (r, s)(h, t) entry whose value has changed due to the update/delete/insert operation, a determination is made as to whether its value has exceeded or fallen just passed above or fallen below the correlation threshold w. If the changed value meets the correlation threshold w, (h, t) is added to the correlation list of (r, s) in the correlation table. On the other hand, if the changed value falls below the threshold w, (h, t) is removed from the correlation list of (r, s) in the correlation table.

III. Similarity Searching

After the inverted grid index and correlation table are generated for a given set of data points N, a similarity search can be performed to retrieve indexed data records that are similar to a given target record using the similarity search methods described in detail below. In accordance with one aspect of the present invention, similarity candidates of a target point may be initially identified by referring to the inverted grid lists 315 (FIG. 3) that correspond to the grid coordinates of the target point (i.e., a given target point has d grid coordinates and each of the grid coordinates has an inverted grid list 315 in the inverted grid index 170).

In yet another embodiment, a "similarity function" is preferably employed to evaluate the closeness of a given similarity candidate to the target point. The results of the evaluation can be stored in a score table 195 (as described below with reference to FIG. 10a). More specifically, a similarity function is preferably employed to compute a closeness (or similarity) score which indicates the closeness (or similarity) between the target point and a given similarity candidate (data point). In addition, a preferred similarity function is "additive" over the dimensions. The term "additive" refers to a property of the similarity function wherein the function can be applied to each dimension separately and the overall score of a given similarity candidate (based on the target point) is computed as the sum of the scores over the different dimensions.

Moreover, in a preferred similarity search routine (as described below with reference to FIG. 10b), a subset of the dimensions are considered by the similarity function for computing similarity scores. A subset of the dimensions selected by the similarity function can be different for different data points. Preferably, for a given similarity candidate, the subset of dimensions that are considered in the similarity function evaluation are those dimensions having a "similar" grid (i.e., the same grid) that contains both the similarity candidate and target point. Alternatively, in other embodiments, a "similar" grid can refer to, e.g., an adjacent grid, or a grid within a predetermined distance from grid of the target point (as opposed to the preferred method where a "similar" grid means the same grid).

Consider the following example (with reference to FIG. 4) wherein it is assumed that a "similar" grid refers to the same grid. In FIG. 4, assume that the target point is data point 7 having a grid coordinate of (1, 2)(2, 4)(3, 3) as shown. For data point 2 having a grid coordinate of (1, 3)(2, 3)(3, 3), only its third dimension has the same grid as the target point. Hence, the similarity function will only consider the third dimension in its closeness evaluation of data point 2 to target point 7. Furthermore, for data point 4 having a grid coordinate of (1, 3)(2, 4)(3, 4), only its second dimension has the same grid as the target point. Hence, the similarity function will only consider the second dimension in its closeness evaluation of point 4 to target point 7.

Consider another example, wherein it is assumed that the target point is 1 having a grid coordinate of (1, 1)(2, 2)(3, 1). Data Point 5 has the same grid coordinates as target point 1. Therefor, all three dimensions will be considered by the similarity function. As indicated above, because the similarity function is preferably additive, the greater the number of dimensions for a similarity candidate that are selected by the similarity function, the more likely that the overall score from the similarity function will be higher.

It is to be appreciated by those skilled in the art that there are different methods for selecting the subset of the dimensions in the similarity function evaluation. For instance, instead of basing the selection on the same or similar grid coordinates (as described above), a distance threshold may be employed to determine whether a dimension should be included. For example, if the distance between the coordinates of a candidate point and the target point on a dimension is within the distance threshold, then that dimension is selected.

Figure 10:
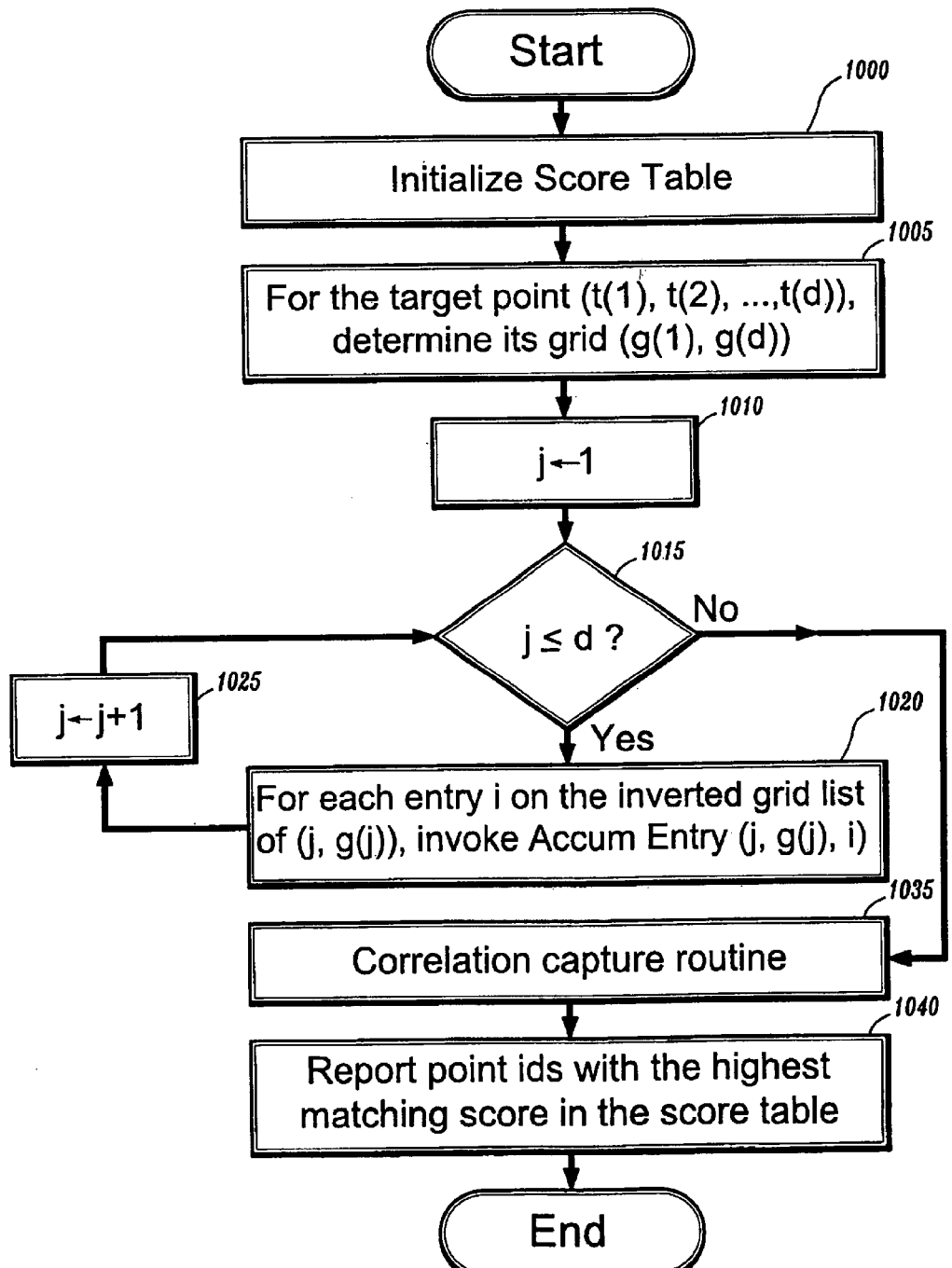
FIG. 10a is a diagram of a data structure of a score table according to an embodiment of the present invention.
FIG. 10b is a flow diagram of a method for similarity searching according to one aspect of the present invention.
Figure 10A:
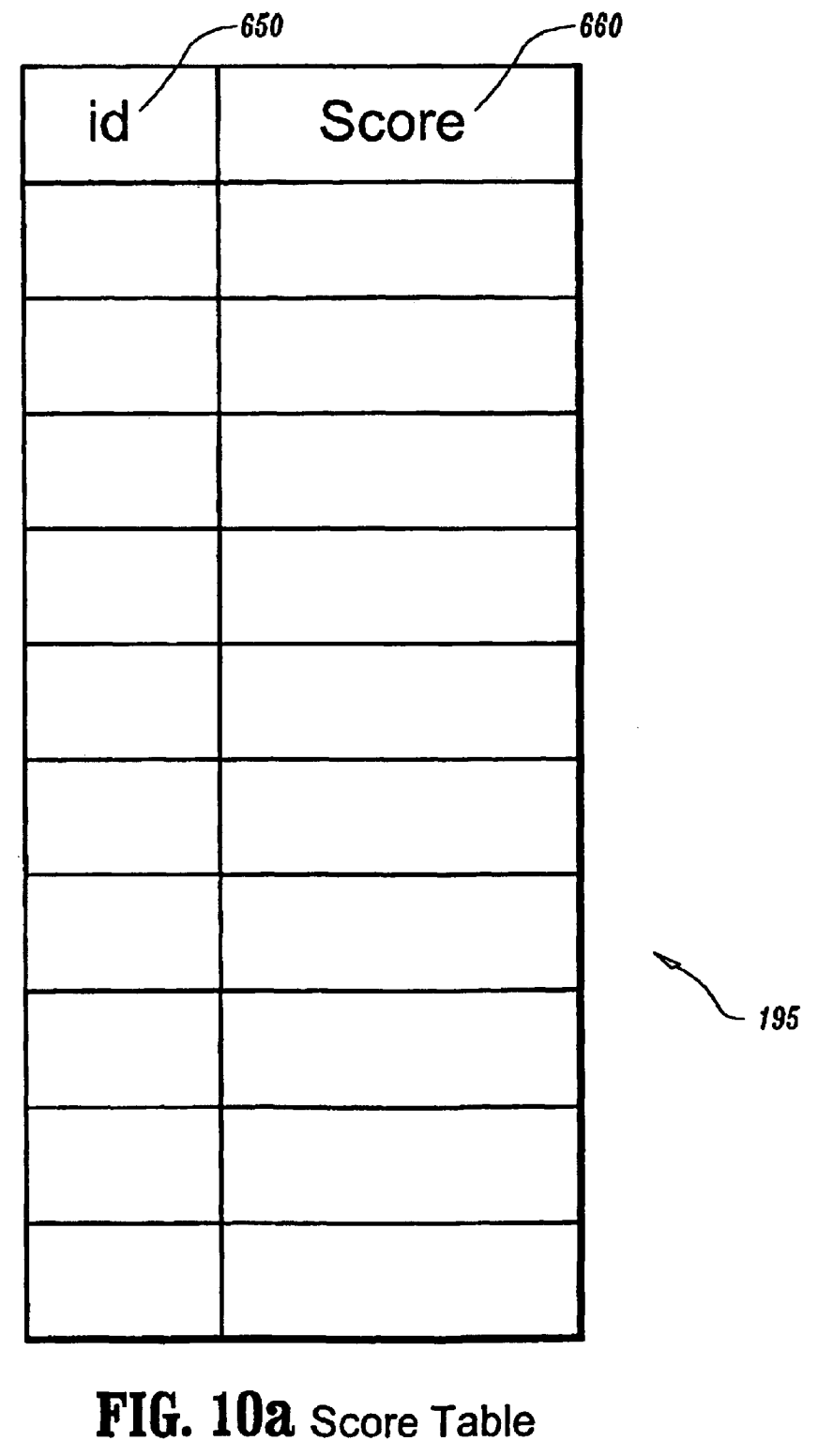

As the similarity candidates are evaluated via the similarity function, the results of the evaluation (scores) for each similarity candidate are stored for further evaluation. The diagram of FIG. 10a depicts an exemplary score table 195 that may be implemented in accordance with the present invention. The score table comprises two fields. A first field 650 comprises an id field which stores the point id of the data point (similarity candidate) and a second field 660 comprises a score field 660. Each entry in the score field 660 of the score table 195 is used to accumulate the score of the corresponding similarity candidate to the target point during the similarity search (as described above and as described in detail below with reference to FIG. 10b). One method for implementing the score table is to use a hash table so as to provide fast and efficient access to the similarity candidate each time its score needs to be updated.

After the score is calculated for each of the similarity candidates, a "similarity selection" method is utilized to select the similarity search result from the similarity candidates based on the scores indicated in the score field 660 of the score table 195. It is to be appreciated that there are various methods for implementing a similarity selection method depending on the application. For example, a similarity selection method may be based on a predetermined threshold value or based on the closest u-neighbors, where the threshold or the u value is an input parameter. More specifically, in a threshold-based implementation, all similarity candidates having a score that exceeds the predetermined threshold value can be selected and returned. Moreover, in a closest u-neighbors implementation, the top u highest score similarity candidates can be selected and returned.

It is to be understood that one rationale for filtering out some of the dimensions is that in high dimensional space (e.g., a thousand dimensions), any pair of data points will likely have some dimensions that are quite different. However, any pair of points which can be similar must have a subset of dimensions that are reasonably close to each other. A goal of the present invention is to identify similarity points having a sufficient number of dimensions that are close together and ignore the effect of the distant dimensions in reporting the similarity search results. Since this similarity result set is generally quite small, those skilled in the art will also appreciate that a post filtering step can be easily added to consider the effect of the other dimensions. Since this post filtering step is application dependent, it is beyond the scope of the present invention.

Referring now to FIG. 10b, a flow diagram illustrates a method for similarity searching according to one aspect of the present invention. Initially, a score table (such as described above in FIG. 10a) is initialized (step 1000). The score table to store the similarity candidates identified by the inverted grid lists of the grid coordinates of the target point. For a given target point comprising, e.g., a coordinate (value) t(i) for each dimension d, (t(1), t(2), ..., t(d)), the grid g(i), (g(1) ... g(d)), of each of its coordinates t(i) is determined (step 1005). As indicated above, the target point comprises d grid coordinates and the grid coordinates for each value (coordinate) t(i) of the target point can be determined from, e.g., the inverted grid index (FIG. 3). The result of step 1005 is a plurality of grid coordinates representing the target point.

A counter j is set to 1 (step 1010). A determination is then made as to whether counter j≦d (step 1015). If j≦d (affirmative determination in step 1015), then for each entry i on the inverted grid list of the corresponding grid coordinate (j, g(j)) of the target point in the inverted grid index, a routine denoted herein as AccumEntry (j, g(j), i) (or similarity function) is invoked to measure the closeness of the target point to similarity candidates.

Figure 11:
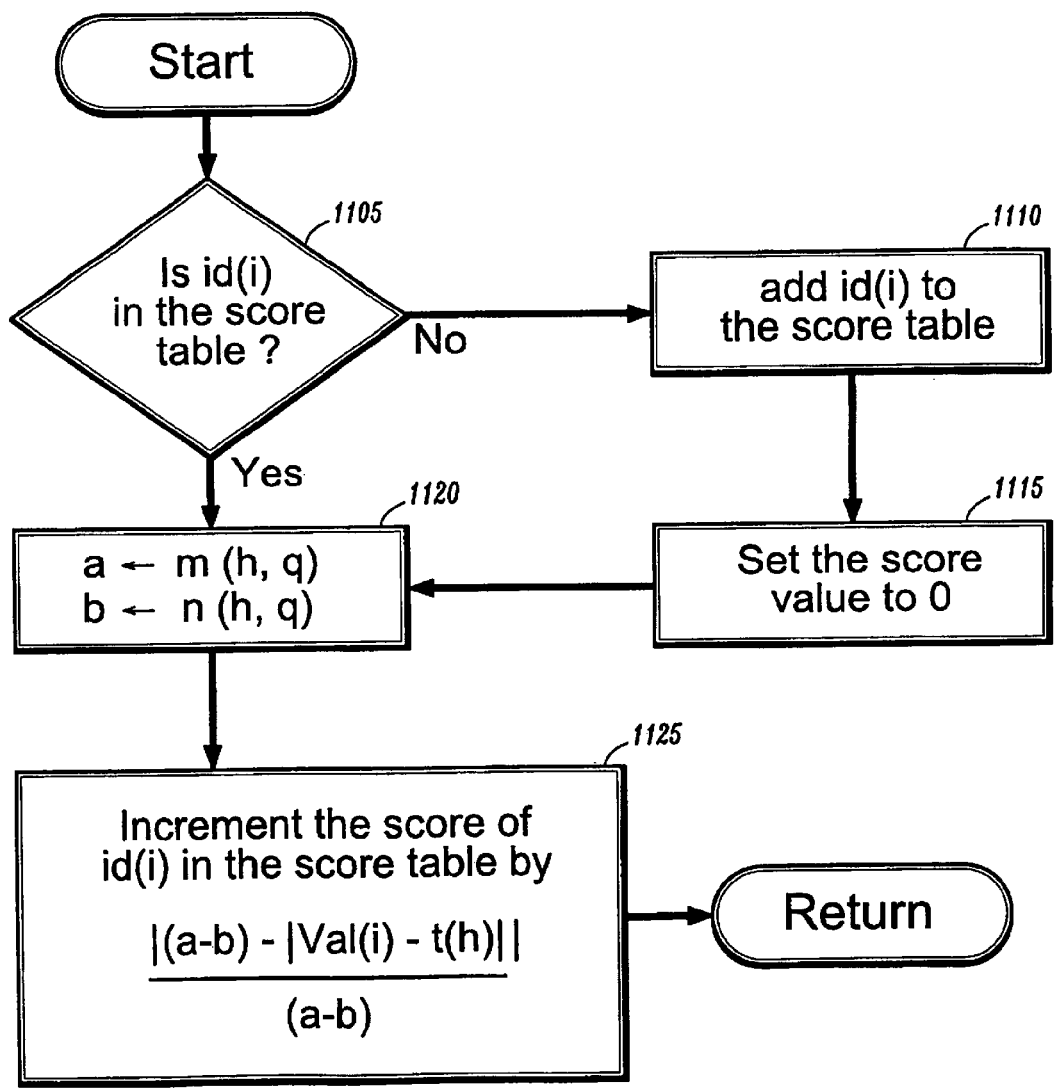
FIG. 11 is a flow diagram of a method for computing a closeness measure of a target point to a similarity candidate according to one aspect of the present invention, which may be implemented in the method of FIG. 10b.

Referring now to FIG. 11, a flow diagram illustrates a AccumEntry (h, q, i) routine according to one aspect of the present invention, wherein parameter h represents the $h^{th}$ dimension, parameter q represents the $q^{th}$ grid, and parameter i indicates the $i^{th}$ element in the inverted grid list of the grid coordinate (h, q) entry in the inverted grid index 170. Initially, a determination is made as to whether id(i) is already in the score table 195 (step 1105). If not (negative determination in step 1105), id(i) is added to the score table as a new entry by setting an id field to id(i) (step 1110). Next, the score value of the entry is set to 0 (step 1115). Then a variable a is set to m(h, q) which, as discussed above with reference to FIG. 3, is the upper bound of the range for grid coordinate (h, q) as given in the range field 310 in the inverted grid index, and a variable b is set to n(h, q) which, as also indicated above, is the lower bound of the range for grid coordinate (h, q) as given in the range field 310 in the inverted grid index (step 1120). The score field corresponding to the id(i) entry in the score table is then incremented by an amount equal to $$\frac{|(a-b) - |val(i) - t(h)||}{(a-b)}$$

(step 1125). It is to be appreciated that this increment represents a component from the additive similarity function on the given dimension h. The magnitude of such value is a function of the "distance" between the similarity candidate (point i) and the target point, wherein the distance is computed as $|val(i)-t(h)|$. The similarity function compares this distance with the range of the grid (a–b) to determine a score.

Referring back to FIG. 10b, after the AccumEntry (j, g(j), i) routine is invoked for each entry i in the inverted grid list corresponding to the grid coordinate (j, g(j)), the counter j is incremented by 1 (step 1025). For the given target point, the AccumEntry (j, g(j), i) routine is invoked for each grid coordinate of the target point (i.e., steps 1020 and 1025 are repeated for each grid coordinate of the target point). When it is determined that j is not $\leq d$ (negative determination in step 1015), then a "correlation capture" routine is invoked (step 1035). This routine allows the correlation information to be considered for the similarity search process.

Figure 12:
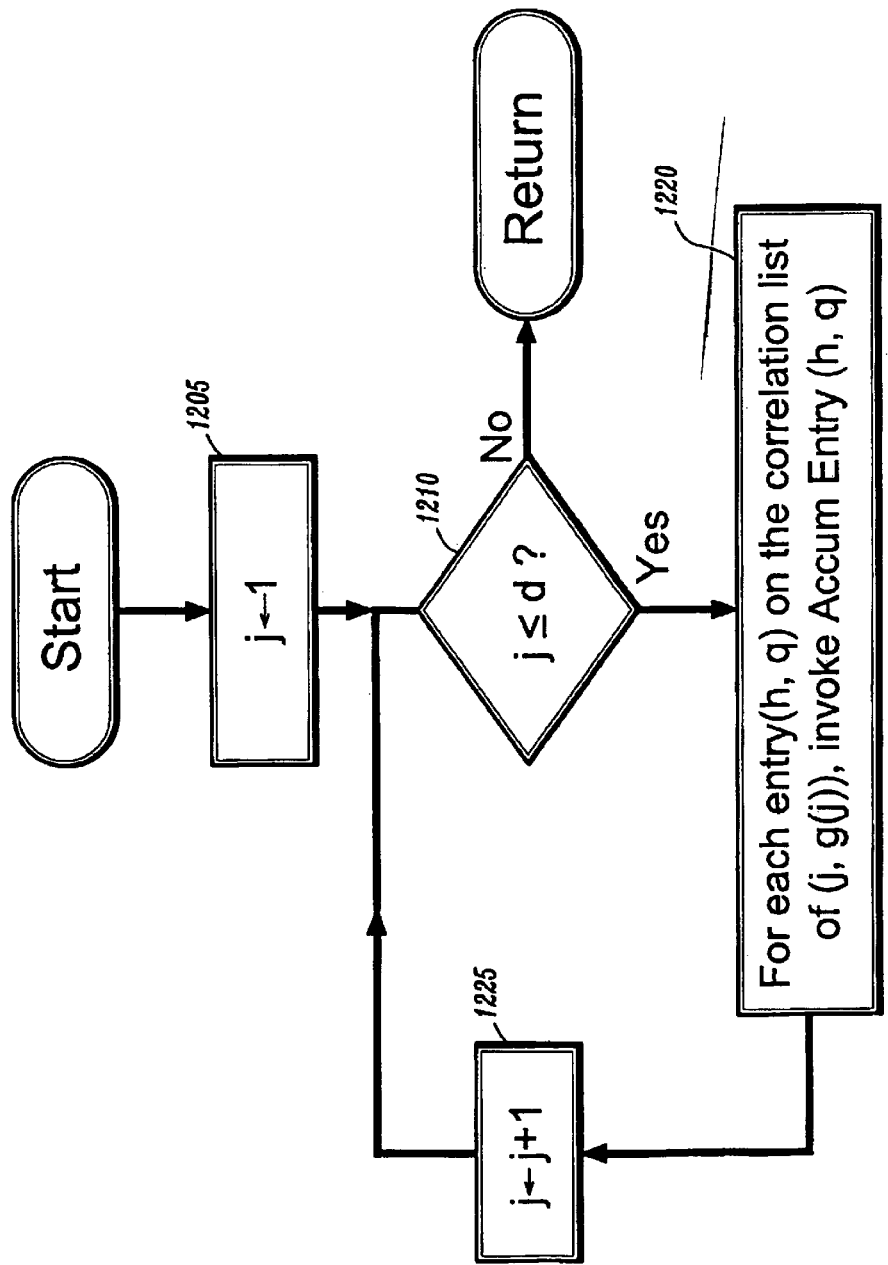
FIGS. 12 and 13 comprise a flow diagram of a method for considering correlation information for performing a similarity search according to one aspect of the present invention, which may be implemented in the method of FIG. 10b.

A correlation capture routine according to one aspect of the present invention is illustrated by the flow diagram of FIG. 12. In FIG. 12, initially, a counter j is set to 1 (step 1205). A determination is then made as to whether counter $j \leq d$ (step 1210). If $j \leq d$ (affirmative determination in step 1210), then for each entry (h, q) in the correlation list corresponding to the grid coordinate entry (j, g(j)) in the correlation table, an AccumEntry (h, q) routine is invoked (step 1220). The counter j is incremented by 1 (step 1225) and step 1220 is repeated for all dimensions d.

Figure 13:
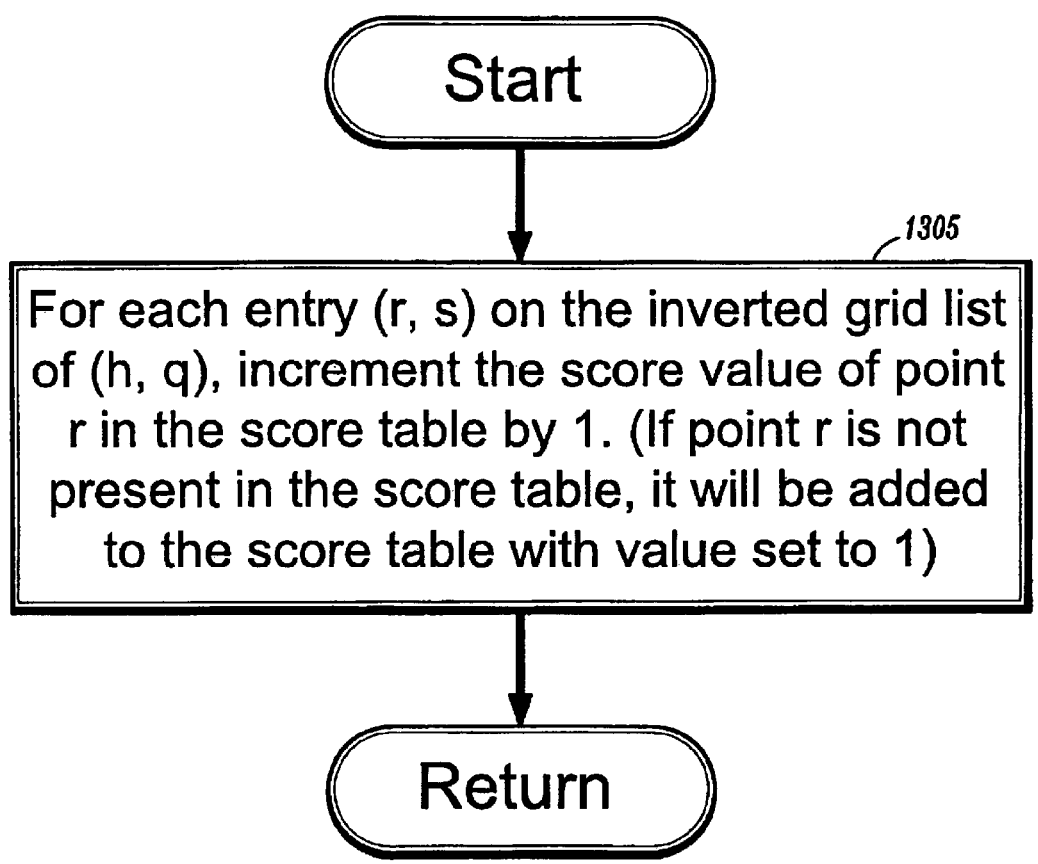

The flow diagram of FIG. 13 illustrates an AccumEntry (h, q) routine according to one aspect of the present invention, wherein the parameter h represents the $h^{th}$ dimension and parameter q represents the $q^{th}$ grid. The grid coordinate (h, q) obtained from the correlation list in the correlation table is used to identify and access the corresponding entry in the inverted grid index. For each entry (r, s) on the inverted grid list of the grid coordinate entry (h, q) in the inverted grid index, the score value (in the score table) of point r is incremented by a predetermined value, which is preferably 1 (step 1305). If point r is not yet present in the score table, a new entry will be added to the score table 195 with the id field set to r and the score field set to the predetermined value, e.g., 1.

The above-described methods of FIGS. 11–13 may be illustrated by the following example. Assume the coordinate of the target data point under evaluation is (2, 2). Referring to FIG. 3., we see that grid coordinate (2, 2) comprises similarity candidates (data points) 1 and 5. Based on the method of FIG. 11, these points are added the score table and their similarity scores are computed via the similarity function and entered in the table. Furthermore, from FIG. 6, we see that grid coordinates(1, 1) and (3, 1) are "strongly" correlated to grid coordinate (2, 2). Accordingly, referring back to FIG. 3, we see that grid coordinate (1, 1) comprises points 1 and 5. Therefore, based on the method of FIGS. 12–13, the previously computed similarity scores for points 1 and 5 would be increased by the predetermined amount (e.g., 1). Likewise, because grid coordinate(3, 1) also comprises points 1 and 5, the similarity score each of these points would be further increased by the predetermined amount. Advantageously, this process allows correlation information to be considered in the similarity evaluation so that data points are that are correlated to the target data point can be accorded higher similarity scores.

Referring back to FIG. 10b, after the correlation capture routine is invoked, a similarity selection process is performed to select the data points that are reported back as the search results. As indicated above, this may be performed by selecting the point ids (given in the id field 650) having the u-highest scores in the score field 660 of the score table 195 or by selecting the point ids having scores that exceed a predetermined threshold.

Those skilled in the art will appreciate that there are many different variations of the similarity function that can be implemented to satisfy the additive property over the different dimensions and that provides a score that increases with the closeness of the similarity candidate and the target point. Furthermore, the process of discretizing into grids has considerable edge effects because two adjacent intervals will contain values which are very close to one another. These edge effects can be eliminated by using a second level of discretization, where each of the k discretized grids are further subdivided into c equi-depth ranges. The inverted grid list for each of the c ranges is maintained separately. Thus, in this case there will be a total of kc inverted lists. For each target record, first the most refined ranges corresponding to them are found, and then ceiling ((c–1)/2) inverted grid lists on either side of each of these refined ranges are explored. The resulting method ensures that for each dimension in the target, the quality on either side is symmetric. This eliminates the edge effects associated with discretization. The larger the value of c that is selected, the less the edge effects; from practical considerations we found the use of c=3 sufficient. The amount of data accessed by the technique is not affected by this further level of discretization; the number of lists explored is multiplied by a factor of c, whereas the size of each of those lists is reduced by the same factor.

IV. Practical Applications

It is to be appreciated that a similarity search method according to the present invention identifies a similar data point to a target data point based on a subset of the dimensions where the two data points are close. These subsets can be different for different similarity points of a given target point. In other words, if both points A and B are close to target point C, they can be close based on different subset of the dimensions. Point A can be close to point C on dimensions 1 and 2 and point B can be close to point C on dimensions 3 and 4.

This method of subsetting the dimensions to find similarity points may be applied in various practical applications, including Web applications and E-commerce applications. In particular, the present invention may be implemented to retrieve documents from a large collection (database) of documents that are similar to a target document or to identify Web pages with similar content to a given Web page from one or more Web sites. In this implementation, each word is a dimension and each document (or Web page) is a data point where its coordinate on a particular word dimension can be a count of the frequency of occurrence of the word in the document. Of course, some stop words, such as are, the, here, etc., can be filtered out to reduce noise and reduce the number of dimensions to be considered. In addition, the occurrence count may be transformed to represent a relative occurrence frequency so as to reduce the impact of the document size or some other damping function (such as square root function) of the occurrence count or relative occurrence count.

Since each document typically has a relatively small number of words compared to the total number of distinct words, many of the dimensions can have a zero coordinate value. In the preferred embodiment, an optimization technique can be employed to eliminate each document from appearing in the inverted grid list of those words that do not appear in the document. In other words, during grid partitioning, the zero count values can be skipped or ignored. Hence, in the inverted grid index, the inverted link list of zero count on each word is eliminated. This would result in significant reduction in the storage requirements of the inverted grid index. Then, a similarity retrieval of documents under the preferred embodiment described above can be based on the words that the two documents have in common, but not on the missing words.

It is to be appreciated that a similarity search and indexing method according to the present invention can also be applied to collaborative filtering in E-commerce. In this implementation, each attribute of a user profile can be deemed a dimension. By way of example, user attribute can include ratings on different products (e.g., preference ratings on different CD's and videos). The method can identify users with similar user attributes or product ratings to a target customer having a predefined rating. For instance, in the case of product ratings, each product can represent a dimension, and each user is represented by a data point. The product rating of a user is represented by a coordinate on the particular product dimension. Since each user will typically rate a small fraction of the total number of available products, the coordinate values of many dimensions are not specified for each user. Indeed, as indicated above, an indexing method according to the present invention does not require each data point in the high dimensional space to be fully specified. In a preferred embodiment, a user profile is indexed on the dimensions that are specified. Therefore, a similarity search of a close peer (e.g., a peer having a similar grid coordinate) to a target customer under the preferred embodiment is based on the products that the two customer have rated in common, but not on the un-rated products.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for managing a plurality of data points in a multi-dimensional space, the method comprising the steps of:
   receiving a plurality of data points, wherein each data point comprises a multi-dimensional record comprising a value in at least one of the dimensions;
   partitioning values of the data points in each dimension into a plurality of grids, wherein each grid is assigned a grid value or a range of grid values; and
   identifying at least one data point in the plurality of data points that is similar to a target data point based on matching grid values.

2. The method of claim 1, wherein the step of identifying is based on matching grid values of a subset of the dimensions.

3. The method of claim 1, wherein at least one of the data points of the plurality of data points is not fully specified in each dimension.

4. The method of claim 1, wherein the step of partitioning comprises equi-depth partitioning.

5. The method of claim 4, wherein a high skew value is ignored for the equi-depth partitioning.

6. The method of claim 1, wherein the step of partitioning is based on the number of dimensions.

7. The method of claim 1, further comprising the step of indexing the plurality of data points to generate an index on data points falling within each dimension.

8. The method of claim 7, wherein the step of indexing comprises the step of indexing data points comprising each dimension to generate an index on data points falling within each grid of each dimension.

9. The method of claim 7, wherein the step of identifying is performed using the index.

10. The method of claim 1, further comprising the steps of:
    computing a similarity score for each of the data points identified as being similar to the target data point; and
    selecting for output the data points having a computed similarity score that meets a predefined selection criterion.

11. The method of claim 10, wherein the predefined selection criterion comprises one of a threshold value and u-best scores.

12. The method of claim 10, wherein the step of computing a similarity score comprises the step of considering a subset of the dimensions to compute the similarity score.

13. The method of claim 12, wherein the similarity score is additive over each dimension in the subset of dimensions.

14. The method of claim 12, wherein for a given dimension in the subset of dimensions, the similarity score is computed based on a grid range and a distance between the similar data point and the target point over the given dimension.

15. The method of claim 12, wherein the subset of dimensions comprises at least one dimension having a grid that comprises both the similar data point and the target data point.

16. The method of claim 12, wherein the subset of dimensions comprises as least one dimension having a first grid comprising the similar data point and a second grid comprising the target data point wherein a distance between the first and second grid falls within a predefined distance threshold.

17. The method of claim 10, further comprising the steps of:
    generating correlation data representing a correlation between grids in different dimensions; and
    utilizing the correlation data to compute the similarity scores.

18. The method of claim 17, wherein the step of utilizing the correlation data to compute the similarity scores comprises increasing a similarity score for a given data point by a predetermined amount based on the correlation data.

19. The method of claim 17, wherein the step of generating correlation data comprises the step of determining a correlation support count between each pair of grids in different dimensions.

20. The method of claim 19, where the correlation support count between a given pair of grids in different dimensions comprises the number of similar data points within the given pair of grids.

21. The method of claim 20, wherein the step of utilizing the correlation data to compute the similarity scores comprises utilizing correlation data associated with a strongly correlated pair of grids to compute the similarity score, wherein a strongly correlated pair of grids comprises a correlation support count that exceeds a predetermined correlation threshold.

22. The method of claim 1, wherein each data point comprises a document, wherein each dimension of each data point comprises a word in the corresponding document, wherein each value of each data point comprises an occurrence count of the corresponding word of the corresponding document, and wherein the method is employed to retrieve at least one document comprising content that is similar to a target document.

23. The method of claim 22, wherein the step of partitioning step considers positive grid values.

24. The method of claim 1, wherein each data point comprises a user, wherein each dimension of each data point comprises a product, wherein each value of each data point comprises a rating value for the corresponding product that is specified by the corresponding user, and wherein the method is employed to identify a user having similar product ratings of a target user.

25. A program storage device readable by a machine, tangibly embodying a program of instructions executable by the machine to perform method steps for managing a plurality of data points in a multi-dimensional space, the method comprising the steps of:
  receiving a plurality of data points, wherein each data point comprises a multi-dimensional record comprising a value in at least one of the dimensions;
  partitioning values of the data points in each dimension into a plurality of grids, wherein each grid is assigned a grid value or a range of grid values; and
  identifying at least one data point in the plurality of data points that is similar to a target data point based on matching grid values.

26. The program storage device of claim 25, wherein the instructions for identifying comprise instructions for matching grid values of a subset of the dimensions.

27. The program storage device of claim 25, further comprising instructions for performing the step of indexing the plurality of data points to generate an index on data points falling within each grid of each dimension, wherein the step of identifying is performed using the index.

28. The program storage device of claim 25, further comprising instructions for performing the steps of:
  computing a similarity score for each of the data points identified as being similar to the target data point;
  selecting for output the data points having a computed similarity score that meets a predefined selection criterion.

29. The program storage device of claim 28, wherein the at least on predefined selection criterion comprises one of a threshold value and u-best scores.

30. The program storage device of claim 28, wherein the instructions for performing the step of computing a similarity score comprise instructions for considering a subset of the dimensions to compute the similarity score.

31. The program storage device of claim 30, wherein the similarity score is additive over each dimension in the subset of dimensions.

32. The program storage device of claim 30, wherein for a given dimension in the subset of dimensions, the similarity score is computed based on a grid range and a distance between the similar data point and the target point over the given dimension.

33. The program storage device of claim 30, wherein the subset of dimensions comprises at least one dimension having a grid that comprises both the similar data point and the target data point.

34. The program storage device of claim 30, wherein the subset of dimensions comprises as least one dimension having a first grid comprising the similar data point and a second grid comprising the target data point wherein a distance between the first and second grid falls within a predefined distance threshold.

35. The program storage device of claim 28, further comprising instructions for performing the steps of:
  generating correlation data representing a correlation between grids in different dimensions; and
  utilizing the correlation data to compute the similarity scores.

36. The program storage device of claim 35, wherein the instructions for performing the step of utilizing the correlation data to compute the similarity scores comprise instructions for increasing a similarity score for a given data point by a predetermined amount based on the correlation data.

37. The program storage device of claim 35, wherein the instructions for performing the step of generating correlation data comprise instructions for performing the step of determining a correlation support count between each pair of grids in different dimensions.

38. The program storage device of claim 37, wherein the correlation support count between a given pair of grids in different dimensions comprises the number of similar data points within the given pair of grids.

39. The program storage device of claim 38, wherein the instructions for performing the step of utilizing the correlation data to compute the similarity scores comprise instructions for utilizing correlation data associated with a strongly correlated pair of grids to compute the similarity score, wherein a strongly correlated pair of grids comprises a correlation support count that exceeds a predetermined correlation threshold.

40. The program storage device of claim 25, wherein each data point comprises a document, wherein each dimension of each data point comprises a word in the corresponding document, wherein each value of each data point comprises an occurrence count of the corresponding word of the corresponding document, and wherein the method steps are employed to retrieve at least one document comprising content that is similar to a target document.

41. The program storage device of claim 25, wherein each data point comprises a user, wherein each dimension of each data point comprises a product, wherein each value of each data point comprises a rating value for the corresponding product that is specified by the corresponding user, and wherein the method steps are employed to identify a user having similar product ratings of a target user.

42. A system for managing a database having a plurality of dimensions, the system comprising:
  a plurality of multi-dimensional objects stored in the database, wherein each multi-dimensional object comprises a value for at least one of the dimensions, and wherein each dimension of the database is partitioned into a plurality of grids based on object values in corresponding dimensions, wherein each grid is assigned a grid value or a range of grid values; and
  a similarity search routine for identifying an object in the database that is similar to a target object based on matching grids.

43. The system of claim 42, wherein the similarity search routine considers a subset of the dimensions for identifying a similar object.

44. The system of claim 42, further comprising an index of objects falling within each dimension, wherein the index is utilized by the similarity search routing for identifying an object that is similar to the target object.

45. The system of claim 44, further comprising an index of objects falling within each grid of each dimension, wherein the index is utilized by the similarity search routine for identifying an object that is similar to the target object.

46. The system of claim 42, further comprising:

a similarity function for computing a similarity score for an object identified as being similar to the target data point, wherein the similarity search routine returns, as a search result, an object having a computed similarity score that meets a predefined selection criterion.

47. The system of claim 46, wherein the similarity function considers a value of each dimension of a subset of the dimensions of an object to compute the similarity score for the object.

48. The system of claim 46, further comprising a correlation table comprising correlation data representing a correlation between grids in different dimensions, wherein the similarity function utilizes the correlation data to compute the similarity scores.

49. The system of claim 42, wherein each object comprises a document, wherein each dimension of each object comprises a word in the corresponding document, wherein each value of each object comprises an occurrence count of the corresponding word of the corresponding document, and wherein the system comprises a document retrieval system for retrieving at least one document comprising content that is similar to a target document.

50. The system of claim 42, wherein each object comprises a user, wherein each dimension of each object comprises a product, wherein each value of each object comprises a rating value for the corresponding product that is specified by the corresponding user, and wherein the system comprises a collaborative filtering system for identifying a user having similar product ratings of a target user.

* * * * *